Patented Dec. 23, 1952

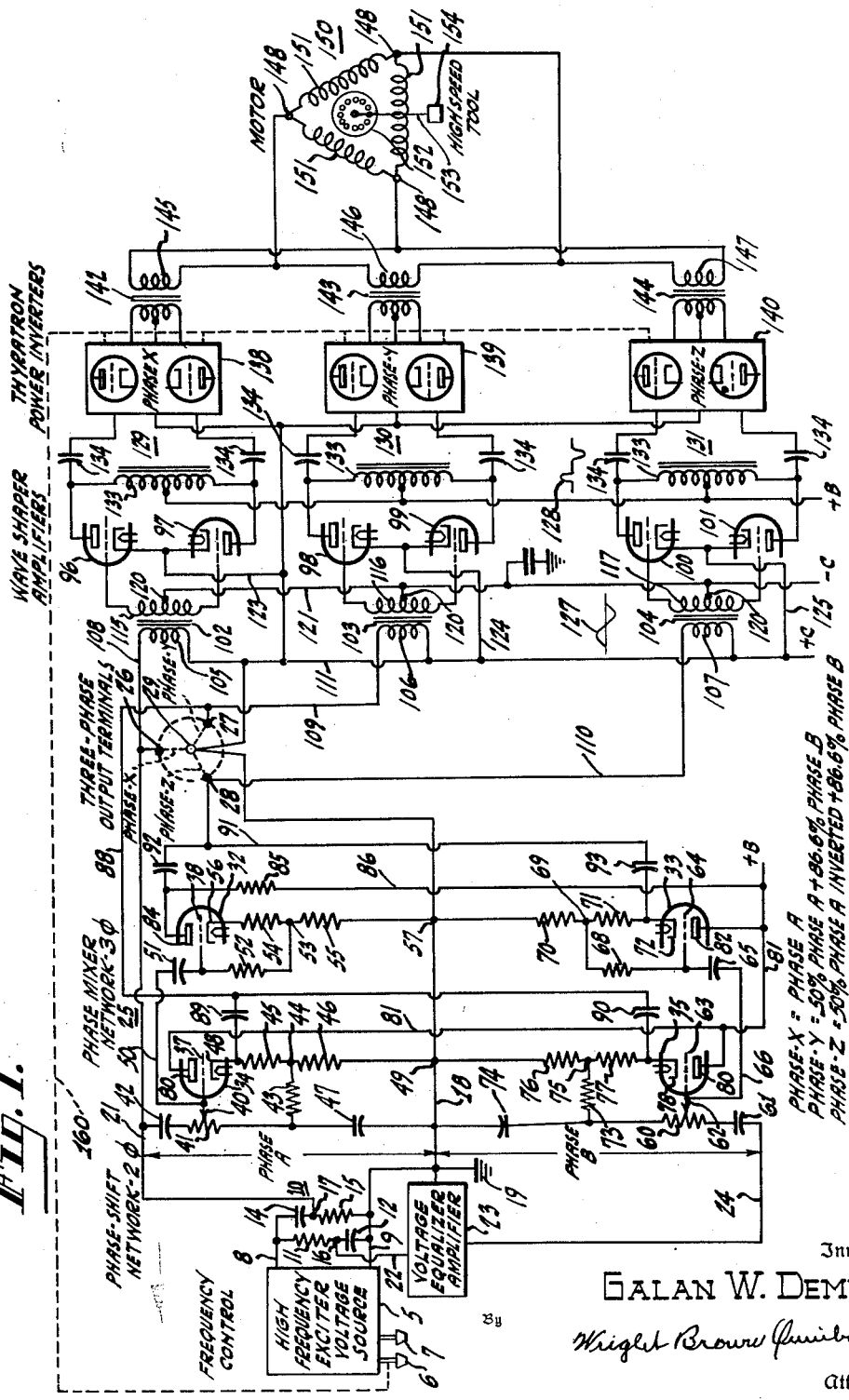

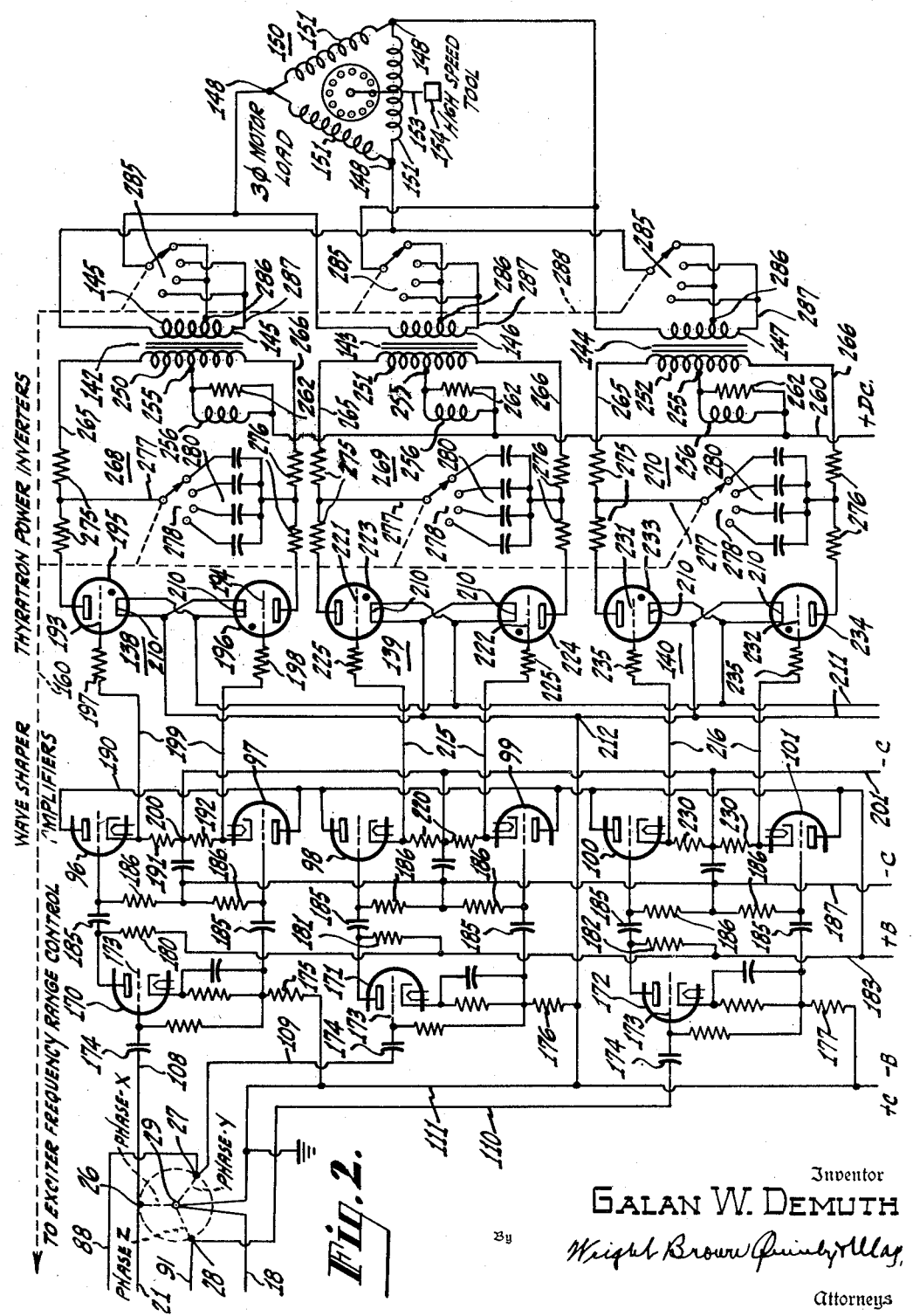

2,623,203

UNITED STATES PATENT OFFICE 2,623,203

HIGH-FREQUENCY POWER SUPPLY SYSTEM

Galan W. Demuth, Moorestown, N. J., assignor to Bryant Chucking Grinder Company, Springfield, Vt., a corporation of Vermont Application October 15, 1949, Serial No. 121,605

10 Claims. (Cl. 321—5)

The present invention relates to high frequency electronic-tube power supply systems, and more particularly to high frequency power supply systems of the thyratron inverter type for converting rectified direct-current power into alternating current power under control of a suitable source of excitation potential, for the operation of high speed industrial motors and the like. Each inverter element of the system includes two gas-triodes or thyratron tubes which are adapted to control relatively heavy unidirectional current flow and operate fullwave in response to the application of controlled excitation potentials to the tubes alternately, while the anode circuits are coupled to the motor or other load through suitable anode circuit networks and output transformer means.

High frequency power supply systems of the above type, for the production of two-phase alternating current, are shown, described and claimed in co-pending applications assigned to the same assignee as this application, as follows: Galan W. Demuth, Serial No. 115,526, filed September 13, 1949, for Exciter Systems for Thyratron Power Inverters and the Like, now Patent No. 2,548,955; Galan W. Demuth, Serial No. 121,604, filed October 15, 1949, for Thyratron Power Inverters, now Patent No. 2,570,651.

In the power supply systems referred to, a variable frequency oscillator or other suitable source of relatively high frequency thyratron excitation potential is coupled to two full-wave thyratron power inverters for triggering or exciting each inverter at the oscillator frequency and providing two-phase alternating current power therethrough in a manner particularly adapted for operating high speed induction motors for directly driving tool elements in high speed grinding, woodworking and other industrial operations. By varying the operating frequency of the oscillator and thereby the rate of triggering of the thyratrons in a certain manner, and suitably operating and controlling the inverters through special circuit means, the speed of the motor may be varied or adjusted as desired. These improved electronic high frequency power supply systems provide new and highly commercial means for deriving and controlling high frequency alternating current power for the operation of high speed industrial motors, as well as for other apparatus requiring appreciable power at relatively high frequency.

As above noted, the power supply systems referred to, provide for effectively controlling the operation of two-phase alternating current motors and the like. It is often desirable to provide three-phase power for the operation of three-phase alternating current industrial motors particularly where the power requirements are greater.

It is therefore a primary object of this invention, to provide an improved high frequency power supply system of the type embodying gastriode or thyratron inverters, for the production of three-phase alternating current power at a controlled frequency.

It is also an object of the present invention, to provide a high frequency thyratron inverter power supply system for three-phase operation under control of a single-phase excitation source.

It is a further object of the invention, to provide an improved thyratron inverter power supply system for the production of three-phase high-frequency alternating current at a variable frequency for the control of high-speed alternating current motors, such as induction motors, which are particularly adapted for highspeed operation by reason of their construction.

A high frequency power supply system, in accordance with the invention, preferably may incorporate full-wave thyratron inverter elements of the type described in the aforementioned application of Galan W. Demuth for Thyratron Power Inverters, and preferably may further include high frequency exciter means for deriving equalized excitation voltages in twophase relation in accordance with the system as described in the aforementioned application of Galan W. Demuth for Exciter Systems for Thyratron Power Inverters and the Like.

Further in accordance with the invention, a variable or fixed high frequency excitation source and phase shift network for deriving balanced or equalized two-phase potentials, are followed by a phase mixer network comprising four electronic tubes, two connected with each phase of the preceding network, and from which three-phase output voltages are derived at the same frequency as the excitation source and in a phase relation that does not change with frequency. The voltage output from each of the three phases is applied through three separate inverter control channels which include wave shaper amplifiers to convert the normal sine wave output as derived from the excitation source, into corresponding pulses after the threephase conversion, and through phase inversion, the pulses are converted to push-pull relation for triggering three pairs of thyratrons coupled to each of the wave shaper amplifiers in each control channel. Each pair of thyratrons are connected in the inverter circuits for full-wave or parallel operation from a suitable direct current source of power, and are transformer coupled to a three-phase output circuit to which a three-phase motor load may be connected.

Various coupling means may be provided between the three-phase output terminals of the phase mixer network and the wave shaper amplifiers, in certain cases transformer coupling being provided, and in others impedance or resistance coupling for better three-phase balance. Single-phase high frequency control at the high frequency excitation source is necessary for proper operation of the system and is followed by a phase-shift network and voltage equalizer means for attaining a balanced two-phase output voltage as an intermediate step preceding the three-phase inversion. For this reason the phase shift (two-phase) network is directly coupled to the phase mixer (three-phase) network, while the wave-shaper amplifiers are interposed in the separate inverter control or excitation channels between the separate thyratron inverters for each output phase and the output terminals of the phase mixer or three-phase network.

Phase inverter means are provided for developing in each of the three phases or channels of the excitation circuit, a transition from a single-ended or single-phase voltage to push-pull voltage for each phase and precedes the wave-shaper means or amplifier. A wave-shaper amplifier for the system therefore includes three pairs of wave-shaper amplifier tubes in balanced or push-pull relation, biased beyond anode current cut-off, and inductance-coupled or cathode-coupled directly into the grids of six thyratrons operating in full-wave pairs in each of the three phases.

The phase mixer network is adapted to receive the two-phase voltages from the phase shift network and is so constructed that 50% of the excitation voltage of the first or A phase of the two input phases, is electronically or vectorially added to 86.6% of the voltage of the second or B phase of the two input phases, and separately 50% of the inverse voltage of the first or A phase is added to 86.6% of the second or B phase voltage. These two electronic additions provide two of the three-phase voltages available at the output terminals of the phase mixer network, and the first or A phase voltage of the two-phase voltages is applied directly to the output terminals of the network as the third of the three-phase voltage terminations.

The novel features that are considered to be characteristic of this invention are further set forth with particularity in the appended claims. The invention itself, however, both as to organization and method of operation, as well as additional objects and advantages thereof, will further be understood from the following description, when read in connection with the accompanying drawings, in which Figure 1 is a schematic circuit diagram of a three-phase power supply system embodying the invention, and Figure 2 is a further schematic circuit diagram of a portion of the power supply system of Figure 1 showing a modification of the invention.

Referring to Figure 1, a single-phase source of high frequency excitation voltage 5, such as a variable frequency oscillator, is provided as a frequency control means for the power supply system whereby the frequency of the output power may be varied in all three phases at the same frequency, and is provided with suitable frequency range and frequency variation control means indicated by the control knobs 6 and 7. The single phase output voltage, which preferably is a sine wave voltage, is derived from the source 5 through output leads 8 and 9 and applied to a phase-shift or two-phase network 10, comprising two circuits or branches connected in parallel across the leads 8 and 9.

One branch of the phase-shift network comprises a resistor 11 and a capacitor 12 in series in the order named, from the lead 8 and the lead 9. The second branch includes a capacitor 14 and a resistor 15 in series, in the order named, between the leads 8 and 9. An output tap connection 16 between the resistor 11 and the capacitor 12, and a second output tap connection 17 between the capacitor 14 and the resistor 15, together with the lead 9 common to both connections, provide two-phase output circuit connections for the exciter voltage source. The values of the capacitors are preferably equal and may be of the order of .1 mfd., for example, while the resistors are likewise equal and may be considered to be of the order of 100,000 ohms in the present example.

The lead 9 is connected to a lead 18 forming the ground return lead for the system and having a chassis ground connection as indicated at 19. This lead is the common return lead for both output connections of the phase shift network as above pointed out. An output lead 21 is connected with the terminal 17 and a second output lead 22 is connected with the terminal 16. In the latter lead a voltage equalizer amplifier 23 is connected for establishing an output potential on an output lead 24 with respect to the lead 18 which is equal at all frequencies to the voltage between the lead 21 and the lead 18, so that the two-phase voltage output from the exciter voltage source is equal in both phases at all frequencies supplied by the source. The two phases may be referred to as phase A and phase B as indicated on the drawing.

The voltages across these two phases are at all times equal by reason of the voltage equalizer amplifier 23. The operation of this amplifier, and of the two-phase network, is described in the aforementioned application of Galan W. Demuth for Exciter Systems for Thyratron Power Inverters and the Like. However, the specific equalizer and network per se do not concern the present invention, hence further description is not believed to be necessary. Any suitable means may be provided for the purpose of deriving the two-phase output from single-phase source and for compensating for the variation in potential in the phase B output of the network as the frequency of the source 5 is varied, whereby a balanced equalized two-phase voltage is provided between the leads 21 and 24 with respect to the lead 18. Furthermore, in the present example, the voltage between the lead 24 and the lead 18 may be taken as lagging, by approximately 90°, the voltage between the lead 21 and the lead 18.

The two-phase output leads are directly connected to the three-phase or phase mixer network 25 which immediately follows the two-phase network. The phase mixer network has three-phase voltage output terminals 26, 27, and 28, arranged in symmetrical relation in a Y-connection with respect to a terminal 29 which is connected with the ground lead 18. The terminals are arranged in the drawing to indicate the Y-connected output for the phase mixer network 25, but in practice may be otherwise arranged, as is readily understood.

In the phase mixer or three-phase network, the lead 21 from phase A of the two-phase network, extends through directly to the three-phase terminal 26. The terminal 28 is coupled to the output circuits of two amplifier tubes 32 and 33 having input coupling with phase A and phase B voltage output leads 21 and 24 respectively, while the terminal 27 is coupled with the output circuits of a pair of amplifier tubes 34 and 35 in turn having input coupling with phase A and phase B voltage output leads 21 and 24 respectively. In other words, the three-phase network has a two-phase input circuit and a three-phase output circuit.

A portion of the phase A signal or excitation voltage between the lead 21 and the lead 18 is applied to the control grids 37 and 38 respectively of the amplifier tubes 34 and 32 through voltage divider means comprising an adjustable tap connection or contact 40 on a potentiometer resistor 41 coupled to the lead 21 through a coupling capacitor 42. The voltage-divider-potentiometer circuit is completed through an isolation resistor 43 to a tap connection 44 between two series cathode coupling resistors 45 and 46 of the tube 34, which are connected between the cathode 48 and a cathode connection 49 with the ground lead 18. A by-pass capacitor 47 for the isolation resistor and cathode resistor 46, is provided as a low impedance signal connection to ground for the current derived through the potentiometer resistor 41.

The grid 37 is connected directly with the contact 40, while the grid 38 is connected therewith through a lead 50 and a coupling capacitor 51. The grid return for the grid 37 is through the potentiometer resistor 41 and the isolation resistor 43 to the self-bias resistor element 45. The grid 38 is connected through a grid resistor 52 with a tap 53 between two cathode coupling resistors 54 and 55 in the cathode lead of the tube 32 between the cathode 56 and a connection 57 with the ground lead 18. In this manner the grids 37 and 38 are biased by reason of the potential drop across the resistor sections or elements 45 and 54 of the cathode coupling system. The resistors 46 and 55 provide additional impedance in series with resistors 45 and 54 respectively for substantially equal cathode coupling impedance in both cathode leads. However, only the cathode coupling provided by resistors 45 and 46 is utilized for the output coupling to be described.

In phase B a similar voltage divider input connection is provided for tubes 33 and 35, comprising a potentiometer resistor 60 coupled to the phase B excitation signal supply lead 24 through a coupling capacitor 61, and having an adjustable output tap connection or contact 62. The latter is connected directly with the control grid 63 of the tube 35 and coupled to the control grid 64 of the tube 33 through a coupling capacitor 65 and a connection lead 66. The grid return for the grid 64 is provided through a grid resistor 68 connected to a tap point 69 between two cathode coupling resistors 70 and 71 in series between the cathode 72 and a cathode connection 57 with the ground lead 18. Likewise, the grid return to cathode for the tube 35 is provided by an isolating resistor 73 connected between the potentiometer resistor 60 and a tap point 75 between two cathode coupling resistors 76 and 77 which are in series between the cathode 78 and a cathode ground lead connection 49. A signal or excitation current by-pass path from the potentiometer 60 to the ground lead 18 is provided through a by-pass capacitor 74.

With this arrangement, the tubes 33 and 35 are biased by reason of the potential drop across the cathode resistors 71 and 77 respectively. The resistors 70 and 76 respectively add impedance to the resistors 71 and 77 for output cathode coupling purposes, as will hereinafter be described.

It will be noted that the anodes 80 of the first or directly coupled amplifier tubes 34 and 35 in each branch or phase are directly connected to a positive anode potential supply lead 81 to which is also connected in like manner, the anode 82 of the tube 33. The anode 84 of the tube 32, however, is connected to the positive supply lead 81 through an output coupling resistor 85 and a lead 86, for anode output coupling purposes.

The three-phase terminal 27 is connected through a lead 88 and coupling capacitors 89 and 90 respectively with the cathodes 48 and 78 of the first amplifier tubes 34 and 35, being thereby coupled to both tubes and both phases of the input circuit by cathode coupling resistors. The three-phase output terminal 28 is likewise connected through a lead 91 and coupling capacitors 92 and 93 respectively with the anode 84 of the tube 32 and the cathode 72 of the tube 33.

The terminal 26 is directly connected with the output or excitation voltage supply lead 21 of phase A from the phase shift network, and receives the voltage output therefrom in full. The terminal 27 is cathode coupled to both an amplifier tube 34 connected with excitation voltage supply lead 21 of phase A and an amplifier tube 35 connected with the excitation voltage supply lead 24 of phase B, the connections in both cases being through voltage divider or gain control means for deriving from phases A and B of the phase shift network a predetermined portion of the excitation voltage thereon for the terminal 27.

For three-phase operation, the voltage divider means 40—41 is adjusted to apply to the grid 37 of the first amplifier 34, substantially 50% of the excitation voltage of the phase A output of the phase shift network or of the two-phase input circuit of the phase mixer network, as provided between the lead 21 and the lead 18. Likewise, the gain control means 60—62 is adjusted to apply to the grid 63 of the first amplifier 35, substantially 86.6% of the excitation voltage of phase B output of the phase shift network or of the two-phase input circuit of the phase mixer network as provided between the leads 24 and 18. Due to the cathode coupling, the output voltage derived from the amplifiers 34 and 35 and applied to the three phase terminal 27 comprises an in-phase mixing of 50% of the phase A voltage and 86.6% of the phase B voltage.

By reason of the coupling of the grid 38 of the amplifier tube 32 with the contact 40, 50% of the phase A voltage is likewise applied to the second phase amplifier 32. This is coupled, through the output impedance 85 and the coupling capacitor 92, with the terminal 28 so that substantially 50% of the phase A voltage inverted, is applied to the terminal 28, whereas 86.6% of the phase B voltage is likewise applied to the terminal 28 without inversion. This is for the reason that the terminal 28 is coupled to the cathode 72 of the second phase B amplifier 33, the control grid 64 of which is coupled with the voltage divider in phase B at the terminal 62. The terminal 28 is therefore cathode-coupled to the amplifier tube 33 in the phase B circuit and anode coupled to the amplifier tube 32 in phase A circuit of the three-phase or mixer network, whereas the terminal 27 is cathode coupled to an amplifier tube in each of the phase A and B circuits of the three-phase or mixer network.

As indicated by the legend in the drawing below circuit diagram, the phase X voltage is directly equal to the phase A voltage; the phase Y voltage is equal to 50% of the phase A voltage plus 86.6% of the phase B voltage, and the phase Z voltage is equal to 50% of the phase A voltage inverted, plus 86.6% of the phase B voltage.

From the foregoing description it will be seen that, in accordance with the invention, the high frequency control means or excitation source provides single-phase signal or excitation voltage output and is directly coupled with a phase shift network to produce therefrom a two phase voltage, that is, two voltages 90 degrees out-of-phase with respect to each other. The lagging phase connection following the phase shift, may be provided with suitable voltage equalizer means for equalizing the voltages for all variations in frequency of the frequency control means. The balanced and equalized two-phase voltages are then applied to a multi-stage amplifier comprising four triodes so connected as to provide a phase mixer network having a two-phase input circuit and a three-phase output circuit or termination. This provides that 50% of the voltage of one phase (phase A) is electronically added to 86.6% of the voltage of the other phase (phase B), and separately 50% of the inverse of the voltage of phase A is added to 86.6% of the voltage of phase B. These two sums provide two of the voltage terminations of the three-phase output for the network of which phase A, directly connected, is the third voltage termination. This arrangement, therefore, provides a series of three-phase voltages for thyratron control particularly adapted for use in connection with thyratron inverters for variable speed three-phase motor operation, as will hereinafter appear.

Further in accordance with the invention, the output voltages between each of the terminals 26, 27, and 28 with respect to the ground and the ground terminal 29, being the output voltages of phases X, Y and Z respectively, are phase-inverted or changed from single voltages to push-pull voltages for application to corresponding pairs of wave-shaper amplifier tubes 96—97, 98—99 and 100—101. The phase inversion is accomplished by means of push-pull coupling transformers 102, 103, and 104, having single-ended primary windings 105, 106, and 107 respectively, coupled respectively to terminals 26, 27 and 28 through leads 108, 109 and 110 respectively. The remaining terminal of each transformer primary is connected to a continuation 111 of the ground lead 18 through connection with terminal 29.

With this coupling circuit, the output voltage from phase X is applied across the primary winding 105, the output voltage of phase Y is applied across the primary winding 106 and the output voltage of phase Z is applied across the primary winding 107. The secondary windings 115, 116, and 117 are center tapped and are connected with the control grids of the amplifier tubes 96—97, 98—99 and 100—101 respectively to provide push-pull operation thereof in pairs as indicated. The wave shaper amplifiers 96—101 are connected through the secondary windings and the center taps 120 with a negative bias potential supply lead 121 which provides a suitable negative biasing potential with respect to the ground lead 18, for operating the tubes beyond anode current cut-off, whereby they are responsive only to the peaks of the input voltage waves and transform the sine wave output delivered by the high frequency exciter voltage source 5 through the phase shift and phase mixer networks, into spaced pulses in push-pull relation in each of the three phases. For this purpose the cathode connections 123, 124, and 125 for the three pairs of amplifier tubes are connected with the ground lead 111 and thus to the positive side of the bias potential supply.

The input voltage wave on the wave-shaper amplifiers 96—101 is represented graphically by the sine wave curve 127 while the output peaked voltage or pulse wave is similarly represented by the curve 128, both being drawn in connection with the respective input and output circuits of the amplifier stage 100—101, and are similar for all three channels. Each of the output circuits 129, 130, and 131 for the wave-shaper amplifiers 96—97, 98—99 and 100—101 respectively is coupled in push-pull or full-wave relation, through impedance coupling means comprising coupling inductors 133 and coupling capacitors 134 as indicated, with full-wave thyratron inverters 138, 139 and 140 respectively, and apply thereto the excitation voltage pulses for effecting full-wave operation to produce an alternating current output corresponding in frequency to the frequency of the excitation source.

The thyratron inverters are preferably of a form hereinafter described, as a source of high frequency alternating current power for motor operation. However, the present inverter system is effective for this purpose. In the inverter stages, the thyratrons 138—140 are provided with power output transformers 142, 143, and 144 respectively having secondary windings 145, 146, and 147, delta-connected with the terminals 148 of a three-phase induction motor 150 having three-phase operating windings 151 and a rotor 152, the latter being connected as indicated by the line 153, to operate a high speed tool 154.

From the foregoing description it will be seen that in the presently considered system, in accordance with the invention, separate full-wave thyratron inverters are provided for each phase of a three-phase system for producing alternating current power, and are coupled through suitable transformer means, as by delta- or Y-connection, with the load or utilization means for the power output which, in a high frequency system as shown, may preferably be a high speed squirrel cage induction motor for high speed grinding and woodworking operations with direct drive for the tool. Each of the inverters is individually driven or excited through a pulse-forming or wave shaper amplifier means from substantially a sine-wave source, an individual push-pull or balanced wave-shaper electronic amplifier being provided for each pair of thyratrons in the inverter system.

Phase inversion from single ended to push-pull operation in connection with the wave-shaper or pulse forming means may be effected through any suitable phase inversion means which does not introduce any appreciable phase shift. Push-pull or balanced coupling transformers, having single primaries for connection individually with the three-phase terminal means have been found to be suitable. The phase mixer network must precede the wave-shaper or pulse forming means and follow the phase shift network for converting single-phase excitation voltage into a balanced and equalized two-phase voltage.

The source of excitation voltage operates at a relatively high frequency, and for industrial motor control of the type referred to, may provide frequencies of the order of from 500–1700 cycles and higher, and the excitation voltage produced may be maintained at any fixed frequency or may be variable as desired. In any case, the phase shift network for producing the two-phase voltage therefrom is preferably such that the sine-wave form of the output voltage is maintained.

The phase-mixer network may be considered to comprise two electronic amplifier tubes having input grid circuits coupled in parallel with one of the two phases provided by the phase shift network and having two additional electronic amplifier tubes provided with input grid coupling also in parallel with the other of the two phases provided by the phase shift network. This network is further provided with one output circuit or connection cathode-coupled to one each of the first and second parallel connected tubes, a second output circuit or connection cathode-coupled to the other of the second pair of parallel connected tubes and anode coupled to the other tube of the first pair of parallel connected tubes, while the third output connection is provided directly with the one phase of the phase shift network, thereby providing a balanced three-phase output circuit in connection with the high frequency exciter voltage source. The three-phase excitation voltage output provides the individual input means for the separate three-phase thyratron inverter channels and power output circuits therefor.

It will be noted that in a preferred form of the invention, the range control knob 6 of the high frequency exciter voltage source 5 is coupled, as indicated by the dotted connection 160, with each of the thyratron inverters 138—140 for control of the output thereto in accordance with changes in the frequency range of operation, corresponding to desired speed range changes for the motor 150, as will be described hereinafter with reference to Figure 2.

The operation of the system shown is as follows: The two-phase network source, comprised of capacitor 12 and resistor 11 in one branch and resistor 15 and capacitor 14 in the other branch passes current in each branch which is in phase with the current in the other branch, since the resistors are equal and the capacitors are equal, or, alternatively the ratio of the capacitive reactance to resistance in one branch is equal to the ratio of capacitive reactance to resistance in the other branch. Instead of capacitors, inductors may be used in a similar manner, with additional precautions against unwanted magnetic coupling to other circuit elements.

The phase of the voltage across capacitor 12 is consequently 90° behind the phase of the voltage across resistor 15, due to the in-phase currents in the two circuit branches. This is true regardless of frequency or the proportion of resistance and capacitive reactance used, so long as the two branches of the phase-dividing network are assembled with the basic relationships described above.

If the resistance is relatively large in proportion to the capacitive reactance in each branch for all frequencies used, then the voltage across resistor 15 is large and relatively constant and nearly in phase with the exciter source voltage, while the voltage across capacitance 12 lags the exciter source voltage and is small and varies inversely with frequency, approximately. This small variable voltage is amplified by the voltage equalizer amplifier 23 to the same relatively constant value as the voltage across resistor 15, by suitable automatic gain-control arrangement described in the first co-pending application referred to, although the phases remain 90° apart for all frequencies of operation. These voltages, phase A and phase B, must remain in sine-wave form and of constant amplitude, for suitable application to the electronic mixing system which follows, for the generation of three-phase signal voltages.

The addition of sine waves separated by 90° in phase produces a sine wave which is intermediate in phase between the phases of the two components, the phase of the resultant wave depending on the relative amplitudes of the components. By adding sine voltages from a two-phase system in the electronic mixer shown, whereby said voltages are so proportioned and adjusted that the relative amplitudes and phases are correct, a three-phase voltage may be derived, and the tube circuits prevent intercoupling between the several phases and between the two-phase and three-phase components. This results from the fact that as the two-phase source is appreciably high in impedance values, and responsive to loading, the mixing of the several voltages from the two phases is isolated or electrically apart from the voltage source, by reason of the application of these several voltages to independent control grids. This system is adjusted by applying an electronic A. C. voltmeter to common output connection 29 and terminals 26, 27 and 28 in turn, as adjustments progress. The voltage of phase X at terminal 26 is established initially by the exciter voltage source adjustment and the circuit design. The voltage at terminal 27 is then adjusted for 50% of the voltage of terminal 26, with circuit connection 24 temporarily removed, using potentiometer 40—41. Then the voltage of terminal 27 is adjusted to equal the voltage at the terminal 26 with circuit connection 24 restored, using potentiometer 60—62.

The voltage at the terminal 28 is automatically established by the proper design of the circuits associated with amplifiers 32 and 33 to provide the same voltage gain ratio as amplifiers 34 and 35, respectively.

Referring now to Figure 2 in which like reference characters are applied to like circuit elements as in Figure 1, the three-phase terminals 26, 27 and 28 are the same, as in the circuit of Figure 1, being the output terminals of the phase mixer or three-phase network, and are connected thereby with the high frequency exciter voltage source in the same manner as in Figure 1 to receive three-phase, equalized voltages.

In the present example, phase inversion in separate channels for each of the three-phase voltages, is accomplished through the medium of three phase-inverter tubes 170, 171 and 172 for phases X, Y and Z respectively. The control grids 173 of the phase inverter tubes are coupled through suitable grid coupling capacitors 174, with the respective Y-connected output leads 108, 109 and 110 from the terminals 26, 27 and 28. The tubes 170—172 are self-biased and are further provided with additional cathode coupling resistor means 175, 176 and 177 respectively, through which the tubes are connected with the ground lead 111 and with the common output terminal 29 of the phase mixer network. The output anode circuits of the phase inverter tubes 170—171—172 are provided with output coupling resistors 180, 181 and 182 respectively, connected with a common anode voltage supply lead 183.

With this arrangement, the voltage output from each of the three phases is inverted to provide corresponding push-pull or balanced voltages for driving the wave-shaper amplifiers 96—101 in full-wave relation as in the preceding embodiment of the invention. The coupling means provided between the phase inverters and the wave shaper amplifiers comprises coupling capacitors 185 and grid resistors 186 providing coupling with the anode impedances or resistors 180—182 and the cathode coupling impedances or resistors 175—177, whereby each of the three wave shaper amplifiers are operated in push-pull or full-wave relation for each phase and in separate amplifying channels.

The negative biasing potential necessary for biasing the wave shaper amplifiers 96—101 beyond anode current cut-off is provided by a negative bias potential supply lead 187 connected with the junction of each pair of grid resistors 186 in each phase of the wave shaper amplifier. The anodes of all of the wave shaper amplifiers are connected directly to an anode voltage supply lead 190 which is connected with the positive anode voltage supply lead 183, while the output coupling impedances for the wave shaper amplifiers are included in the cathode circuits, whereby positive output pulses are derived while the negative pulses are suppressed, thereby providing more effective firing or excitation of the thyratrons in the inverters 138, 139 and 140.

For this purpose the amplifiers 96 and 97 are provided with cathode coupling resistors 191 and 192 respectively, across which the cathodes are directly coupled with the control grids 193 and 194 of the thyraton tubes 195 and 196 in the inverter 138, the connection including series current limiting resistors 197 and 198. With this arrangement, the balanced input grid circuit 199 for the thyratron inverter 138 includes the cathode resistors 191 and 192, and receives biasing potential through a center tap connection 200 between the resistors 191 and 192, with negative bias potential supply lead 201.

The cathodes 210 of the three pairs of thyratrons in the three inverter stages are connected in parallel with filament supply leads 211, one of which is provided with a connection 212 with the ground lead 111 which will be noted as being a continuation of the cathode return connection for all circuits of the system.

The remaining pairs of wave shaper amplifiers 98—99 and 100—101 for the two remaining phases or control channels, are coupled with the corresponding thyratron inverters 139 and 140 respectively, through similar grid input circuits 215 and 216 which will readily be understood from the foregoing description of the connections for the inverter 138. The input grid circuit 215 is connected between the cathode coupling resistors 220 for the tubes 98—99 and the control grids 221 and 222 of thyratron tubes 223 and 224, the connections including the series limiting resistors 225 as in the thyratron inverter 138.

The input grid circuit 216 for the thyratron inverter stage 140 includes cathode coupling resistors 230 for the tubes 100—101 and the control grids 231 and 232 for the thyratron tubes 233 and 234, series grid current limiting resistors 235 being included serially in the circuit 216 in connection with each grid as in the inverters above described.

This coupling system is at present preferred and is described more in detail in the co-pending application for thyratron power inverters initially referred to, and accordingly needs no further description. This system is shown herein as being best adapted for coupling each of the single-phase amplifier channels or phases of the three-phase system with each of the three balanced or parallel thyratron power inverters, whereby improved operation may be obtained, although any other suitable coupling may be provided for effectively applying the excitation or triggering potentials to the thyratrons in each phase so that they are alternately fired and quenched and the inverters are operated in three-phase relation.

Any suitable output coupling system may be provided which is effective to operate the thyratrons in each stage or phase alternately for causing alternating current to flow through the primary windings 250, 251 and 252 of each of the output transformers 142, 143 and 144 respectively for the inverters 138, 139 and 140, as previously described in connection with the circuit of Figure 1.

The transformer primaries are each provided with center taps 255 connected, through individual choke coils 256 for each inverter, with a positive direct current supply lead 260 through which operating current is supplied to the thyratrons. Each choke coil is preferably of the air-core type provided with a shunt connected peak voltage limiting resistor 262.

The terminals of each of the primaries of the output transformers 142—144 are connected through anode circuit leads 265 and 266 in each inverter, with the respective anodes in balanced relation. Intermediate controlling networks 268—270 are included in each balanced anode circuit of the several inverters. Each controlling network includes two series resistor arms 275 and 276 in the anode leads 265 and 266 respectively, with shunt capacitive arms 277 symmetrically connected across the circuits 265—266 between the arms 275 and 276, in each inverter. The arms 277 include selector switches 278 for selectively connecting one of a series of capacitors 280 in the shunt arms 277 for controlling the frequency response characteristics or operation of the several inverters at various operating frequenices. For this purpose the switches 278 are connected for operation through means indicated by the dotted line connection 160, with the frequency band change or range control device 6 of the high frequency exciter voltage source 5 forming part of the present system, as shown in Figure 1. By this means the thyratron inverters are each individually adjustable for the same frequency range of operation corresponding to a desired speed range of control for the connected motor load 150.

As in the preceding embodiment, the secondaries 145—147 for the output transformers of the thyratron inverters, are connected in delta arrangement with the motor terminals 148, the present circuit being modified to include a voltage changing tap-switch 285 for each secondary providing selective connections with a tap 286 and one end lead 287 for each secondary, whereby the voltage output from each inverter stage is adjustable between two values as determined by the taps 286 in relation to the end connections 287. The voltage change switches 285 are connected for operation in unison through a mechanical connection 288 indicated by the dotted line and this is in turn connected with the controlling connection 160 for the tap switches 278 in the output anode circuits of the inverters.

With this arrangement, the output voltage on the motor load 150 is set at first a lower value as provided by the position of the tap switches 285 indicated in the drawing, and moves next to the higher voltage connection as the tap switches are adjusted in conformance with the frequency band change, and again lowered upon the next step when a change in size of motor is made corresponding to a new speed range. In general the voltage output is maintained by this arrangement, when the frequency is changed, and as the system is operative with any suitable compensating means for this purpose, further description is not believed to be necessary. However, the three-phase system of the present invention preferably includes suitable means for the control of the thyratrons and of the output voltage in accordance with changes in the frequency corresponding to a desired speed for the motor load, and the system shown herein is presently preferred for this purpose.

From the foregoing description it will be seen that high frequency power may be provided for the three-phase operation of industrial motors and the like through the medium of thyratron inverters, and that the power supply frequency may be arranged for adjustment or variation as in the single-phase and two-phase systems hereinbefore referred to, without introducing undesired operating characteristics.

By providing a single-phase variable frequency source as the controlling medium and following this source with a two-phase network from which equalized two-phase voltages are obtained for excitation of the thyratron means, the transition to three-phase control potentials is made independent of frequency through the medium of a phase-mixer network comprising wholly electronic means and resistance-capacitance coupling.

Furthermore the three-phase output terminals of the phase-mixer network are Y-connected to suitable phase inverter means for deriving three separate-channel push-pull voltages corresponding to each of the three phases. The phase inversion may be accomplished also by electronic tube means and being at present preferred by reason of the lack of any frequency characteristic in the coupling provided in advance of the wave-shaping or pulse-forming circuits.

With the single-phase excitation voltage successively converted to two-phase and then to three-phase potentials and finally to three-channel or three-phase push-pull voltages, the excitation may then be readily applied to three separate full-wave or parallel connected thyratron inverters, one inverter for each separate channel or phase. As pointed out, the coupling between the thyratron inverters and the phase inverters in each channel of the three-phase excitation system preferably may include wave-shaper amplifiers for imparting to the normal sine-wave output from the excitation source, a pulse wave which is of the same frequency in each phase and of a positive polarity for more effectively triggering or exciting the thyratron inverters.

The thyratron inverters may be operated in any suitable manner and preferably as described in the thyratron power inverter application initially referred to herein, whereby the thyratron inverter output circuits are effectively controlled for power generation and adjusted for operation in accordance with adjustments in the frequency of the excitation source.

The motor load may be connected to the thyratron inverters through suitable output changing means as pointed out whereby, as the frequency of the source is increased, the voltage on the motor may be stepped to a higher value. This is for the reason that as the frequency is increased, for example, the voltage across the primaries of the output transformers remains at approximately the same level, thereby requiring an increase in the secondary winding turns to provide the increased voltage required by the motor. This arrangement in the present example provides for two different voltages for each of two different motors, in practice, one motor being used for lower speeds, the other for higher speeds. The higher speed motor is designed for one-half the operating voltage in proportion to frequency as compared with the lower speed motor, as the operating voltage would otherwise be excessive at high frequencies.

It is essential that the wave-shaper means such as the wave-shaper amplifiers in each of the three channels or phases of the control system, immediately precede the thyratron inverter stages and follow the three-phase or phase-mixer network, as the phase-mixer is only effective for voltages of sine wave form at the operating frequency. Furthermore, the three-phase mixer network combines the two-phase voltages from the phase-shift network in such a manner that neither of the two phase voltages are reflected back to the other phase, thereby providing an excitation system, which may have a wider frequency response, covering the entire range of operation of the variable frequency control means.

Therefore the present system is effective to provide three-phase power at frequencies above 500 cycles per second and extending smoothly through frequencies of 1700 cycles and higher, thereby to provide operating speeds for industrial motors of from 3000 to above 100,000 revolutions per minute. The result is a three-phase power output which is balanced at all frequencies of operation and is substantially independent of frequency so that the motor load is supplied with adequate power at all frequencies.

Thus a thyratron inverter for variable speed three-phase motor operation may be attained through the use of a readily controllable single phase source of excitation and the single-phase source may be varied in frequency without causing an unbalance in the three-phase power output at any frequency. By this means, therefore, higher operating frequencies and speeds may be attained, than has heretofore been possible with known forms of three-phase power supply for high speed motor operation, such as motor generators and other forms of rotary power generating means.

I claim:

1. A high frequency power supply system comprising in combination, a high frequency excitation voltage source having a single-phase voltage output, a phase-shift network coupled to said voltage source for deriving therefrom a corresponding two-phase voltage output; a phase-mixer network coupled to said phase-shift network having a two-phase input circuit and three-phase output terminals for converting said two-phase voltage output into three-phase excitation voltages at said terminals, said phase-mixer network including electronic tube amplifier means coupling two of said output terminals each with both sides of said two-phase input circuit for effecting addition of the input circuit voltages in predetermined phase relation at said output terminals, means providing a separate amplifier channel coupled to each of said terminals, a full-wave electronic tube inverter coupled to the output of each of said amplifier channels for receiving amplified excitation voltages therefrom in three-phase relation, a three-phase output circuit coupled to said inverters for supplying power to a three-phase motor load, and voltage divider means in each side of said two-phase input circuit for proportioning the input circuit voltages applied to said amplifier means.

2. A high frequency power supply system as defined in claim 1, wherein the excitation voltage source and the frequency response of the inverters are jointly adjustable in predetermined relation for effecting frequency variation of the inverter power output.

3. A high frequency power supply system comprising in combination, a high frequency thyratron excitation voltage source having a single-phase voltage output, a phase-shift network coupled to said voltage source for deriving therefrom a corresponding two-phase voltage output, means for equalizing said two-phase voltage output whereby two substantially equal thyratron excitation voltages are provided in two-phase relation, a phase-mixer network coupled to said phase-shift network including impedance-coupled electronic-tube amplifier means having a two-phase input circuit and three-phase output terminals for converting said two-phase voltages into three-phase excitation voltages at said terminals, means providing a separate electronic-tube impedance-coupled amplifier channel having separate input circuits coupled each to one of said terminals, a full-wave thyratron-type electronic-tube inverter coupled to the output of each of said amplifier channels for receiving amplified excitation voltages therefrom in three-phase relation, and a three-phase output circuit coupled to said full-wave inverters for supplying power to a three-phase motor load.

4. A high frequency power supply system comprising in combination, a high frequency thyratron excitation voltage source having a single-phase voltage output, a phase-shift network coupled to said voltage source for deriving therefrom a corresponding two-phase voltage output, means for equalizing said two-phase voltage output whereby two substantially equal thyratron excitation voltages are provided in two-phase relation, a phase-mixer network coupled to said phase-shift network and including impedance-coupled electronic tube amplifier means having a two-phase input circuit and three-phase output terminals for converting said two-phase voltages into three-phase excitation voltages at said terminals, means providing a separate electronic-tube amplifier channel coupled to each of said terminals, each of said amplifier channels including phase-inverter means for deriving in each channel push-pull voltages corresponding in frequency to the frequency of the excitation voltage source and having a phase displacement between channels corresponding to the phase displacement of the excitation voltages at the three-phase terminals, balanced electronic-tube amplifier means in each of the separate channels for imparting a pulse shape to the push-pull three-phase voltages, a full-wave thyratron inverter coupled to the output of each of said amplifier channels for receiving amplified excitation voltages therefrom, and a three-phase output circuit coupled to said thyratron inverters for supplying power to a three-phase motor load.

5. A three-phase high frequency power supply system comprising in combination, means providing a single-phase excitation voltage source, phase-shift means for deriving balanced two-phase output voltages therefrom, a phase-mixer network coupled to said phase-shift network having terminal means providing a three-phase output, said phase-mixer network including impedance-coupled electronic-tube amplifier circuits and being responsive to the frequency of the excitation voltage source to provide three-phase output voltages corresponding thereto in frequency, a full-wave thyratron inverter coupled to each of the output terminals of said phase mixer network, said coupling including wave-shaper electronic-tube amplifier circuits for applying pulsed grid excitation to said inverters, a balanced power output transformer for each of said inverters having a secondary winding, and a power output circuit connecting said secondary windings in three-phase relation.

6. A power supply system as defined in claim 5, wherein the phase mixer network includes one pair of electronic amplifier tubes coupled to the phase-shift means to derive substantially 50% of one two-phase output voltage therefrom and a second pair of electronic amplifier tubes coupled to the phase-shift means for deriving substantially 86.6% of the other of the two-phase output voltages therefrom, and wherein one output terminal of the phase-mixer network is coupled directly to one phase of the phase-shift means to receive one of the two-phase output voltages therefrom, and the remaining terminals are each impedance coupled to one amplifier tube in each pair to receive therefrom the derived components of the two-phase output voltages in predetermined phase relation for vectorial addition in three-phase relation at said terminals.

7. A power supply system as defined in claim 6, wherein one of said remaining three-phase terminals is anode-coupled to one of the first pair of amplifier tubes and cathode-coupled to one of the second pair of amplifier tubes, and the other of said remaining terminals is cathode-coupled to the remaining two amplifier tubes in the phase mixer network, and wherein individual voltage divider means are provided in the said electronic tube couplings to provide said derived voltage ratios.

8. A three-phase variable frequency power supply system comprising in combination, a single phase excitation voltage source, phase-shift means for deriving balanced two-phase output voltages therefrom, a phase mixer network coupled to said phase shift network including impedance coupled electronic tube amplifiers and terminal means providing a three-phase Y-connected output, said phase mixer network being responsive to the frequency of the excitation voltage source to provide three-phase output voltages corresponding thereto in frequency, a full wave thyratron inverter coupled to each of the output terminals of said phase mixer network and including a pair of push-pull connected thyratron inverter tubes, said coupling including waveshaper amplifiers for applying pulsed grid excitation to said inverters, a balanced power output transformer for each of said inverters having a secondary winding, a power output circuit connecting said secondary windings in three-phase relation, and means for jointly controlling the frequency of said excitation voltage source and the frequency response characteristic of said inverters, said last named means including an adjustable anode circuit control network interposed between each inverter and the output transformer therefor.

9. A high frequency power supply system comprising in combination, a high frequency excitation voltage source having a single-phase substantially sine-wave voltage output, a phase-shift network coupled to said voltage source for deriving therefrom a corresponding two-phase voltage output, an electronic-tube impedance-coupled phase-mixer network coupled to said phase-shift network and having a two-phase input circuit and three-phase output terminals for converting said two-phase voltage output into three-phase excitation voltages at said terminals, said phase-mixer network comprising a first pair of electronic amplifier tubes having input grid circuits connected effectively in parallel with one phase of said two-phase input circuit, and a second pair of electronic amplifier tubes provided with input grid circuits connected effectively in parallel with the other phase of said two-phase input circuit, an output circuit connection for one of said three-phase terminals cathode-coupled to one each of said first and second pairs of electronic amplifier tubes, a second output connection for a second one of said three-phase terminals cathode-coupled to the other of said first pair of tubes and anode coupled to the other of said second pair of tubes, and a third output circuit connection for the third one of said three-phase terminals directly coupled to said one phase of said two-phase input circuit, thereby providing a balanced three-phase output circuit in connection with the high frequency excitation voltage source, voltage divider means in each side of said two-phase input circuit for proportioning the input circuit voltages applied to said pairs of amplifier tubes, means providing a separate amplifier channel coupled to each of said terminals, a full-wave electronic tube inverter coupled to the output of each of said amplifier channels for receiving amplified excitation voltages therefrom in three-phase relation, and a three-phase output circuit coupled to said inverters for supplying power to a three-phase motor load.

10. A high frequency power supply system comprising in combination, a high frequency excitation voltage source having a single-phase voltage output, a phase-shift network coupled to said voltage source for deriving therefrom corresponding two-phase voltages, a phase-mixer network coupled to said phase-shift network having a two-phase input circuit and three-phase output terminals for converting said two-phase voltages into three-phase excitation voltages at said terminals, said phase-mixer network being adapted to receive said two-phase voltages from the phase-shift network through said input circuit and including electronic tube circuits coupled and phased to add substantially 50% of one two-phase voltage vectorially to substantially 86.6% of the other two-phase voltage at one output terminal of the mixer network, and to add substantially 50% of the inverse of the one two-phase voltage vectorially to substantially 86.6% of the other two-phase voltage at another output terminal of the mixer network, means providing a separate amplifier channel coupled to each of the phase-mixer network terminals, a full-wave electronic-tube inverter coupled to the output of each of said amplifier channels for receiving amplified excitation voltages therefrom in three-phase relation, and a three-phase output circuit coupled to said full-wave inverters for supplying power to a three-phase motor load.

GALAN W. DEMUTH.

REFERENCES CITED

The following references are of record in the file of this patent:

UNITED STATES PATENTS

| Number | Name | Date |
|---|---|---|
| 1,198,381 | Hewitt | Sept. 12, 1916 |
| 1,243,430 | Lamme | Oct. 16, 1917 |
| 1,843,521 | Smith | Feb. 2, 1932 |
| 2,053,426 | Evans | Sept. 8, 1936 |
| 2,250,961 | Livingston | July 29, 1941 |